(12) United States Patent
Nishio

(10) Patent No.: US 8,441,556 B2
(45) Date of Patent: May 14, 2013

(54) IMAGE FORMING OPTICAL SYSTEM AND IMAGE PICKUP APPARATUS EQUIPPED WITH SAME

(75) Inventor: Akinori Nishio, Tachikawa (JP)

(73) Assignee: Olympus Imaging Corp., Tokyo (JP)

( * ) Notice: Subject to any disclaimer, the term of this patent is extended or adjusted under 35 U.S.C. 154(b) by 217 days.

(21) Appl. No.: 13/068,966

(22) Filed: May 24, 2011

(65) Prior Publication Data

US 2011/0292253 A1    Dec. 1, 2011

(30) Foreign Application Priority Data

May 31, 2010   (JP) .................................. 2010-124928

(51) Int. Cl.
*H04N 5/262* (2006.01)

(52) U.S. Cl.
USPC .................... 348/240.3; 348/335; 359/766

(58) Field of Classification Search .................. 359/764, 359/766, 763, 659, 714, 746, 753; 348/240.3, 348/240.99, 335–357
See application file for complete search history.

(56) References Cited

U.S. PATENT DOCUMENTS

| | | | |
|---|---|---|---|
| 5,930,049 A * | 7/1999 | Suenaga et al. | 359/650 |
| 6,259,508 B1 * | 7/2001 | Shigematsu | 355/53 |
| 7,593,165 B2 | 9/2009 | Souma | |
| 7,755,848 B2 * | 7/2010 | Satori | 359/690 |
| 2008/0304161 A1 | 12/2008 | Souma | |
| 2009/0147380 A1 * | 6/2009 | Yokoyama | 359/766 |
| 2010/0220229 A1 * | 9/2010 | Sano | 348/340 |

FOREIGN PATENT DOCUMENTS

| JP | 2007-264395 | 10/2007 |
|---|---|---|
| JP | 2008-304708 | 12/2008 |

* cited by examiner

*Primary Examiner* — Nelson D. Hernández Hernández
(74) *Attorney, Agent, or Firm* — Kenyon & Kenyon LLP

(57) ABSTRACT

An optical system including five lens units having, in order from the object side, positive, negative, positive, negative, positive refracting powers respectively. The distances between the lens units change during zooming. The first and third lens units are located closer to the object side at the telephoto end than at the wide angle end of the zoom range. The first lens unit includes a negative lens, a first positive lens, and a second positive lens. The second lens unit includes a plurality of negative lenses and at least one positive lens. The third lens unit includes a plurality of positive lenses and at least one negative lens. The fourth and fifth lens units each include two lenses or less. The refractive indices of the at least one negative lens in the first lens unit, the at least one positive lens in the second lens unit, and the at least one negative lens in the third lens unit are not lower than 1.9. The optical system satisfies a certain condition.

10 Claims, 13 Drawing Sheets

IMAGE FORMING OPTICAL SYSTEM AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2010-124928 filed on May 31, 2010; the entire contents of which are incorporated herein by reference.

BACKGROUND OF THE INVENTION

1. Field of the Invention

The present invention relates to an image forming optical system, in particular to an image forming optical system having a high zoom ratio. The present invention also relates to an image pickup apparatus equipped with such an image forming optical system.

2. Description of the Related Art

In recent years, digital cameras and video cameras that pick up an image of an object using a solid state image pickup element such as a CCD or CMOS have replaced film cameras and become the mainstream of the image pickup apparatus. There are various categories of digital cameras ranging from popular-priced compact type cameras to high end function rich cameras.

Users of compact type digital cameras generally wish to enjoy easy shooting in various shooting situations. Therefore, they prefer small size digital cameras with good portability. Size reduction of zoom lenses that are equipped in or attached to such digital cameras are also needed accordingly.

For use with an image pickup element having a large number of pixels, a zoom lens having high optical performance that is matched with the number of pixels is preferred. On the other hand, there are needs for const reduction. In addition, in order to increase the variety of shooting situations, a zoom lens having a wide angle of view at the wide angle end and a high zoom ratio is needed.

Japanese Patent Application Laid-Open Nos. 2008-304708 and 2007-264395 discloses compact zoom lenses having a high zoom ratio that can suitably be used with an image pickup element having a large number of pixels.

Japanese Patent Application Laid-Open No. 2008-304708 discloses a zoom lens including, in order from its object side, a first lens unit having a positive refracting power, a second lens unit having a negative refracting power, a third lens unit having a positive refracting power, a fourth lens unit having a negative refracting power, and a fifth lens unit having a positive refracting power. This zoom lens has a zoom ratio as high as approximately 12.

Japanese Patent Application Laid-Open No. 2007-264395 discloses a zoom lens including, in order from its object side, a first lens unit having a positive refracting power, a second lens unit having a negative refracting power, a third lens unit having a positive refracting power, a fourth lens unit having a negative refracting power, and a fifth lens unit having a positive refracting power. This zoom lens has a zoom ratio as high as approximately 10.

SUMMARY OF THE INVENTION

An image forming optical system according to the present invention comprises, in order from its object side:
a first lens unit having a positive refracting power;
a second lens unit having a negative refracting power;
a third lens unit having a positive refracting power;
a fourth lens unit having a negative refracting power; and
a fifth lens unit having a positive refracting power, wherein
during zooming from the wide angle end to the telephoto end, the first lens unit, the second lens unit, the third lens unit, the fourth lens unit, and the fifth lens unit move, and the distances between the lens units change,
the image forming optical system further comprises an aperture stop that moves integrally with the third lens unit during zooming,
the first lens unit is located closer to the object side at the telephoto end than at the wide angle end,
the third lens unit is located closer to the object side at the telephoto end than at the wide angle end,
the first lens unit comprises, in order from the object side, a negative lens, a first positive lens, and a second positive lens,
the second lens unit comprises a plurality of negative lenses and at least one positive lens,
the third lens unit comprises a plurality of positive lenses and at least one negative lens,
the fourth lens unit and the fifth lens unit each comprise two lenses or less,
the refractive index of the at least one negative lens in the first lens unit for the d-line, the refractive index of the at least one positive lens in the second lens unit for the d-line, the refractive index of the at least one negative lens in the third lens unit for the d-line are not lower than 1.9, and
the image forming optical system satisfies the following conditional expressions (1) and (2):

$$0.40 < f_1/f_{Tele} < 0.63 \quad (1) \text{ and}$$

$$-0.1 < f_2/f_{Tele} < -0.04 \quad (2),$$

where $f_1$ is the focal length of the first lens unit, $f_2$ is the focal length of the second lens unit, and $f_{Tele}$ is the focal length of the entire image forming optical system at the telephoto end.

An image pickup apparatus according to another aspect of the present invention comprises:
the above-described image forming optical system,
an image pickup element disposed on the image side of the image forming optical system and having an image pickup surface on which an image is formed by the image forming optical system;
an image transforming section that transforms, by image transformation, a signal representing the image picked up by the image pickup element into a signal representing an image that is corrected in terms of distortion; and
a display section that displays the image that is corrected in terms of distortion based on the transformed image signal.

DETAILED DESCRIPTION OF THE INVENTION

Figure 1A:
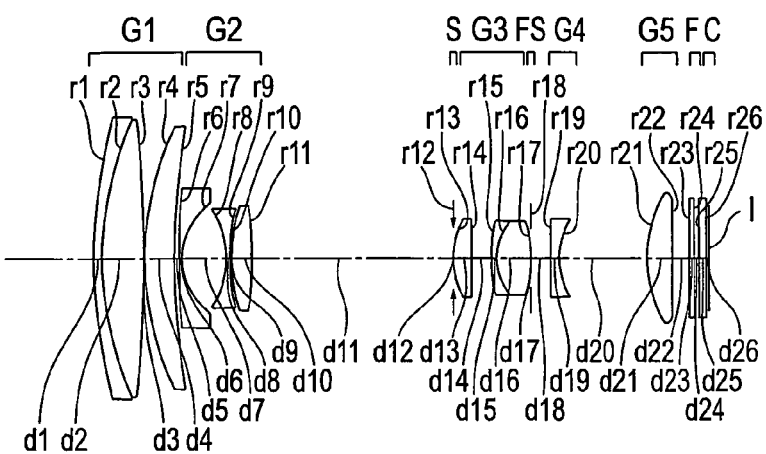
FIGS. 1A and 1B are cross sectional views of a zoom lens according to a first embodiment of the present invention in the state in which the zoom lens is focused on an object point at infinity, respectively at the wide angle end and at the telephoto end.

The image forming optical system according to the present invention includes, in order from its object side:
a first lens unit having a positive refracting power;
a second lens unit having a negative refracting power;
a third lens unit having a positive refracting power;
a fourth lens unit having a negative refracting power; and
a fifth lens unit having a positive refracting power, wherein
during zooming from the wide angle end to the telephoto end, the first lens unit, the second lens unit, the third lens unit, the fourth lens unit, and the fifth lens unit move, and the distances between the lens units change,
the image forming optical system has an aperture stop that moves integrally with the third lens unit during zooming,
the first lens unit is located closer to the object side at the telephoto end than at the wide angle end (of the zoom range),
the third lens unit is located closer to the object side at the telephoto end than at the wide angle end,
the first lens unit includes, in order from the object side, a negative lens, a first positive lens, and a second positive lens,
the second lens unit includes a plurality of negative lenses and at least one positive lens,
the third lens unit includes a plurality of positive lenses and at least one negative lens,
the fourth lens unit and the fifth lens unit each include two lenses or less,
the refractive index of the at least one negative lens in the first lens unit for the d-line, the refractive index of the at least one positive lens in the second lens unit for the d-line, the refractive index of the at least one negative lens in the third lens unit for the d-line are not lower than 1.9, and
the image forming optical system satisfies the following conditional expressions (1) and (2):

$$0.40 < f_1/f_{Tele} < 0.63 \quad (1)$$ and $$-0.1 < f_2/f_{Tele} < -0.04 \quad (2)$$

where $f_1$ is the focal length of the first lens unit, $f_2$ is the focal length of the second lens unit, and $f_{Tele}$ is the focal length of the entire image forming optical system at the telephoto end.

The image forming optical system according to the present invention includes a first lens unit having a positive refracting power; a second lens unit having a negative refracting power; a third lens unit having a positive refracting power, a fourth lens unit having a negative refracting power, and a fifth lens unit having a positive refracting power, wherein zooming is performed by moving the lens units in such a way that the distances between lens units change.

This configuration is advantageous for reducing the change aberrations during zooming, for preventing an increase in the amount of movement of each lens unit, and for achieving good optical performance and adequate zoom ratio.

As the first lens unit is located closer to the object side at the telephoto end than at the wide angle end, the overall length of the image forming optical system at the wide angle end can be made short and the effective diameter thereof at the wide angle end can be made small. Moreover, the second lens unit can provide an adequate magnification with this configuration. This facilitates an increase in the angle of view and an increase in the zoom ratio.

With the above-described way of movement of the third lens unit, even the third lens unit can be designed to have the function of changing magnification. Consequently, the contribution of the second lens unit to the magnification change can be made smaller. Therefore, an adequate zoom ratio and a reduced change in aberrations can both be achieved.

Moving the aperture stop integrally with the third lens unit facilitates a reduction in the overall length of the optical system at the wide angle end and a reduction in the diameter of the third lens unit.

In order to reduce the overall length of the optical system at the telephoto end and in order for the second lens unit to provide an adequate magnification changing effect, it is preferred that the first lens unit have a high positive refracting power. In addition, it is preferred that the first lens unit have an appropriate number of lenses with the above-described configuration so as to reduce aberrations that might otherwise be caused by the high positive refracting power.

In order for the contribution of the second lens unit and the third lens unit to the magnification to be appropriately large, it is preferred that the second lens unit and the third lens unit each include an appropriate number of lenses with the above-described configuration so as to achieve both a adequate refracting power and correction of aberrations. This is advantageous for correction of axial chromatic aberration, in particular.

The fourth lens unit having a negative refracting power can provide excellent correction of curvature of field, in particular. In addition, the fourth lens unit has the function of refracting off-axis beams away from the optical axis. Thus, the fourth lens unit provides, in cooperation with the fifth lens unit having a positive refracting power that will be described later, the function of making the exit pupil farther from the image plane in a small space.

Since the fourth lens unit and the fifth lens unit are not required to have a high refracting power, they may be composed two lenses or less.

In addition, the refractive indices (for the d-line) of the at least one negative lens in the first lens unit, the at least one positive lens in the second lens unit, and the at least one negative lens in the third lens unit are not lower than 1.9. This means that each of the first, second, and third lens units has a lens having a refracting power with the sign opposite to the refracting power of the lens unit and that lens is made of a material having a high refractive index. The use of the material having a high refractive index can provide large dispersion at low cost.

Therefore, adequate cancellation of aberrations such as chromatic aberration can be achieved in the respective lens units by the refraction and dispersion provided by the lenses having high refractive indices. In consequence, each of the lens units can have an adequate refracting power with reduced aberrations, in particular reduced chromatic aberration of magnification at zoom positions near the wide angle end and reduced axial chromatic aberration at zoom positions near the telephoto end.

Conditional expressions (1) and (2) specify preferred ranges of the refracting power of the first lens unit and the second lens unit respectively.

The first lens unit is designed to have an appropriately low refracting power so that the lower limit of the conditional expression (1) is not reached. This facilitates correction of aberrations in the first lens unit and facilitates a reduction in the number of lenses included in the first lens unit.

The first lens unit is designed to have an appropriately high refracting power so that the upper limit of the conditional expression (1) is not exceeded. Then, the amount of movement of the first lens unit can be made small, and the magnification change provided by the second lens unit can be made appropriately large. This is advantageous for reducing the size of the optical system at the telephoto end and for achieving appropriately high zoom ratio.

The second lens unit is designed to have an appropriately high refracting power so that the lower limit of the conditional expression (2) is not reached. Then, the magnification change provided by the second lens unit can be made appropriately large. This is advantageous for reducing the size of the optical system at the telephoto end and for achieving appropriately high zoom ratio.

The second lens unit is designed to have an appropriately low refracting power so that the upper limit of the conditional expression (2) is not exceeded. This facilitates correction of aberrations in the second lens unit and facilitates a reduction in the number of lenses included in the second lens unit.

If the image forming optical system has a focusing function, the features described in the foregoing and following should be interpreted as those for the state in which the image forming optical system is focused on an object at the longest distance.

It is more preferred that any one of the following features be adopted.

According to a preferred mode of the present invention, it is desirable that the first lens unit include, in order from the object side, a cemented lens made up of the negative lens and the first positive lens, and the second positive lens.

Having a cemented lens made up of a negative lens and a positive lens, and a positive lens in the first lens unit enables good correction of aberrations throughout the entire zoom range from the wide angle end to the telephoto end. This feature is particularly advantageous for correction of axial and off-axis chromatic aberration.

According to a preferred mode of the present invention, it is desirable that the cemented lens in the first lens unit satisfy the following conditional expressions (3) and (4):

$$0.4 < N_1 - N_2 < 2.0 \qquad (3), \text{and}$$

$$\nu_1 - \nu_2 < -56.4 \qquad (4),$$

where $N_1$ is the refractive index of the negative lens in the first lens unit for the d-line, $N_2$ is the refractive index of the first positive lens in the first lens unit for the d-line, $\nu_1$ is the Abbe constant of the negative lens in the first lens unit, $\nu_2$ is the Abbe constant of the first positive lens in the first lens unit.

Having a cemented lens made up of a positive lens and a negative lens in the first lens unit is advantageous for correction of chromatic aberration.

Conditional expressions (3) and (4) specify preferred ranges of the difference in the refractive indices and the difference in the Abbe constants of the lenses in the cemented lens in the first lens unit for correction of chromatic aberration.

It is preferred that the material of the negative lens in the cemented lens have a higher refractive index and a higher dispersion than the positive lens in the cemented lens. If the lower limit of conditional expression (3) is not reached and the upper limit of conditional expression (4) is not exceeded, the difference in the dispersions of the two lenses in the cemented lens can be adequately large. This is advantageous for correction of chromatic aberration.

It is preferred that the refractive index of the negative lens be moderately low so that the upper limit of conditional expression (3) is not exceeded in order for formed images not to be affected by decentering of the negative lens.

According to a preferred mode of the present invention, it is desirable that the first lens unit include two lens components, the second lens unit include two negative lenses and one positive lens, the third lens unit include two positive lens and one negative lens, the fourth lens unit include only one negative lens component, and the fifth lens unit include only one positive lens component. Here the term "lens component" is defined to mean a lens member whose surfaces that are in contact with air on the optical axis include only two surfaces, one being an object side surface and the other being an image side surface.

With this lens configuration, the lens units can provide respective desired functions, and a reduction in the cost and the length (or thickness) of the optical system in the collapsed state can be facilitated.

According to a preferred mode of the present invention, it is desirable that a half angle of view at the wide angle end satisfy the following conditional expression (5):

$$44° < \omega_w \qquad (5),$$

where $\omega_w$ is the half angle of view of the image forming optical system at the wide angle end.

Since the image forming optical system according to the present invention is advantageous for reduction of its length at the wide angle end, it is easy to provide an appropriate optical path at the wide angle end. This is advantageous for achieving a wide angle of view.

The image forming optical system may have an appropriately large angle of view, or the half angle of view may be larger than the lower limit of conditional expression (5). This desirably allows shooting in various situations.

According to a preferred mode of the present invention, it is desirable that the following conditional expression (6) be satisfied:

$$0.93 < f_{Tele}/Z_{Tele} < 1.7 \qquad (6),$$

where $f_{Tele}$ is the focal length of the entire image forming optical system at the telephoto end, and $Z_{Tele}$ is the overall length of the image forming optical system from its object side end face to the image plane at the telephoto end.

If conditional expression (6) is satisfied, the first, second and third lens units can be designed to have appropriate refracting powers with small aberrations, advantageously. This is advantageous for a reduction in the size and an increase in the zoom ratio.

If the lower limit of conditional expression (6) is not reached, the size of the image forming optical system at the telephoto end can be made small, advantageously.

If the upper limit of conditional expression (6) is not exceeded, the image forming optical system can easily be designed to have an appropriately small F number.

According to a preferred mode of the present invention, it is desirable that only the fifth lens unit move during focusing.

The fourth lens unit can provide excellent correction of curvature of field. Therefore, the shift of the image plane with the focusing operation from a long object distance to a short object distance performed by moving the fifth lens unit is small. In consequence, good correction of aberrations can be achieved whether the object point is at a long distance or at a short distance.

According to a preferred mode of the present invention, it is desirable that the following condition be satisfied:

$$8.5 < f_{Tele}/f_{wide} \quad (7),$$

where $f_{Wide}$ is the focal length of the entire image forming optical system at the wide angle end.

Since the present invention is advantageous for achieving a high zoom ratio, it is preferred that the image forming optical system is designed to have a zoom ratio that satisfies conditional expression (7) so as to allow shooting in various situations.

According to a preferred mode of the present invention, it is desirable that the image forming optical system consist of five lens units including, in order from the object side, the first lens unit, the second lens unit, the third lens unit, the fourth lens unit, and the fifth lens unit.

With this feature, preferred size reduction can be realized while keeping good performance.

The image pickup apparatus according to the present invention comprises:

the above-described image forming optical system, an image pickup element disposed on the image side of the image forming optical system and having an image pickup surface on which an image is formed by the image forming optical system;

an image transforming section that transforms, by image transformation, a signal representing the image picked up by the image pickup element into a signal representing an image that is corrected in terms of distortion;

and a display section that displays the image that is corrected in terms of distortion based on the transformed image signal.

The image pickup apparatus as above is equipped with an image forming optical system that is advantageous for achieving size reduction and high zoom ratio.

It is more preferred that at least one negative lens in the first lens unit and at least one negative lens in the third lens unit each have a refractive index higher than 1.903.

When this is the case, chromatic aberration can be made small, while the first and third lens units have appropriately high positive refracting powers. This is advantageous for achieving size reduction and high zoom ratio.

It is preferred that the negative lens in the first lens unit, the positive lens in the second lens unit, and the negative lens in the third lens unit have refractive indices lower than 3.1, in order for the image quality not to be affected by decentering of the lenses.

It is more preferred that the range of each of the conditional expressions be further limited as follows. With such further limitations, the advantageous effects of the present invention can be achieved more effectively.

In conditional expression (1), it is more preferred that the lower limit value be 0.45, still more preferably 0.5, and the upper limit value be 0.6, still more preferably 0.58, still more preferably 0.55.

In conditional expression (2), it is more preferred that the lower limit value be −0.12, still more preferably −0.1, and the upper limit value be −0.04, still more preferably −0.07.

In conditional expression (3), it is more preferred that the lower limit value be 0.403, and the upper limit value be 1.5, still more preferably 1.0.

In conditional expression (4), it is preferred from the viewpoint of the availability of the lens materials that a lower limit value of −80, more preferably −60 be further set so that this limit is not reached.

In conditional expression (5), it is preferred from the viewpoint of reduction of the size of the first lens unit that an upper limit value of 90°, more preferably 50° be further set so that this limit is not exceeded.

In conditional expression (6), it is more preferred that the lower limit value be 0.95, still more preferably 0.96, and the upper limit value be 1.5, still more preferably 1.3.

In conditional expression (7), it is preferred from the viewpoint of reduction of the overall length of the optical system at the telephoto end that an upper limit value of 30, more preferably 20 be further set so that this limit is not exceeded.

It is preferred that two or more of the above-described features of the invention be adopted at the same time.

If the image forming optical system has a focusing function, the features described in the foregoing should be interpreted as those for the state in which the image forming optical system is focused on an object at the longest distance.

In the following, embodiments in which the image forming optical system according to the present invention is applied to zoom lenses will be described in detail with reference to the drawings. The embodiments are not intended to limit the present invention.

The following embodiments for which numerical data will be presented are satisfactorily compact image forming systems having good optical performance with well-corrected axial chromatic aberration and chromatic aberration of magnification while having a wide angle of view and a zoom ratio as high as 15 to 20.

The image forming optical system according to the embodiments can be used in image pickup apparatuses such as video cameras and digital cameras.

In the following, the zoom lenses according to first to fourth embodiments of the present invention will be described. FIGS. 1A and 1B, 2A and 2B, 3A and 3B, and 4A and 4B are cross sectional views of the zoom lens according to the first, second, third and fourth embodiments in the state in which the zoom lenses are focused on an object point at infinity respectively at the wide angle end (FIGS. 1A, 2A, 3A, and 4A) and at the telephoto end (FIGS. 1B, 2B, 3B, and 4B). In FIGS. 1A and 1B, 2A and 2B, 3A and 3B, and 4A and 4B, a first lens unit is denoted by G1, a second lens unit is denoted by G2, an aperture stop is denoted by S, a third lens unit is denoted by G3, a flare stop is denoted by FS, a fourth lens unit is denoted by G4, a fifth lens unit is denoted by G5, a plane parallel plate constituting a low pass filter on which wavelength range restriction coating for restricting infrared light is denoted by F, a plane parallel plate constituting a cover glass for an electronic image pickup element is denoted by C, and the image plane is denoted by I. The cover glass C may have a multi-layer film for wavelength range restriction applied on its surface. The cover glass C may be designed to have the function of a low pass filter.

In all the embodiments, the aperture stop S moves integrally with the third lens unit G3. All the numerical data presented below are for the state in which the zoom lens is focused on an object at infinity. In the numerical data, dimensions are in millimeters and angles are in degrees. In all the embodiments, the focusing operation is performed by moving the lens unit located closest to the image side.

Figure 1B:
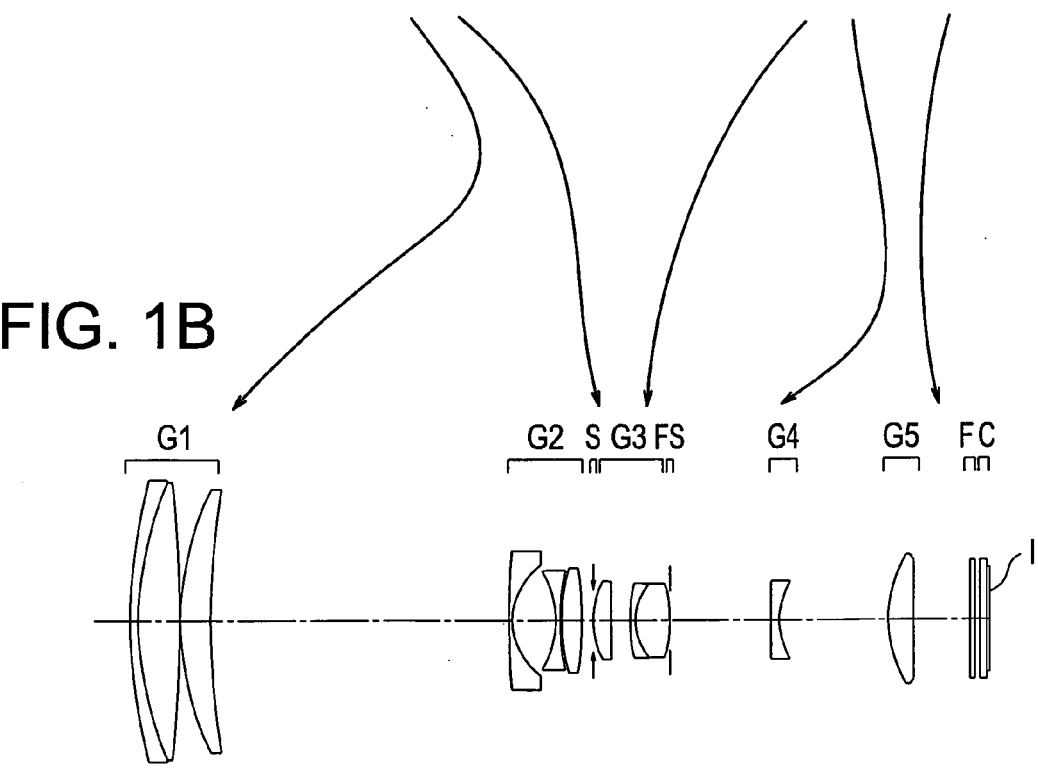

As shown in FIGS. 1A and 1B, the zoom lens according to the first embodiment includes, in order from its object side, a first lens unit G1 having a positive refracting power, a second lens unit G2 having a negative refracting power, an aperture stop S, a third lens unit G3 having a positive refracting power, a flare stop FS, a fourth lens unit G4 having a negative refracting power, and a fifth lens unit G5 having a positive refracting power.

During zooming from the wide angle end to the telephoto end, the first lens unit G1 first moves toward the image side and thereafter reverses its moving direction to move toward the object side, the second lens unit G2 moves toward the image side, the third lens unit G3 moves toward the object side, the fourth lens unit G4 first moves toward the image side and thereafter reverses its moving direction to move toward the object side, and the fifth lens unit G5 first moves toward the image side and thereafter reverses its moving direction to move toward the object side.

The first lens unit G1 is composed of a cemented lens made up of a negative meniscus lens having a convex surface directed toward the object side and a biconvex positive lens, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a biconvex positive lens, and a cemented lens made up of a negative meniscus lens having convex surface directed toward the object side and a biconvex positive lens. The fourth lens unit G4 is composed of a negative meniscus lens having a convex surface directed toward the object side. The fifth lens unit G5 is composed of a positive meniscus lens having a convex surface directed toward the object side. The lens elements included in each of the lens units are arranged in the mentioned order from the object side.

There are six aspheric surfaces, which include both surfaces of the biconvex negative lens in the second lens unit G2, both surfaces of the object side biconvex positive lens in the third lens unit G3, and both surfaces of the biconvex positive lens in the fifth lens unit G5.

Figure 2A:
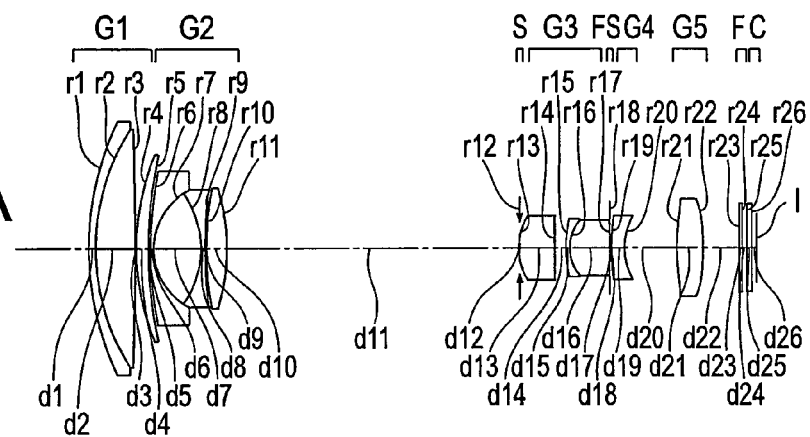
FIGS. 2A and 2B are cross sectional views, similar to FIGS. 1A and 1B, of a zoom lens according to a second embodiment of the present invention.
Figure 2B:
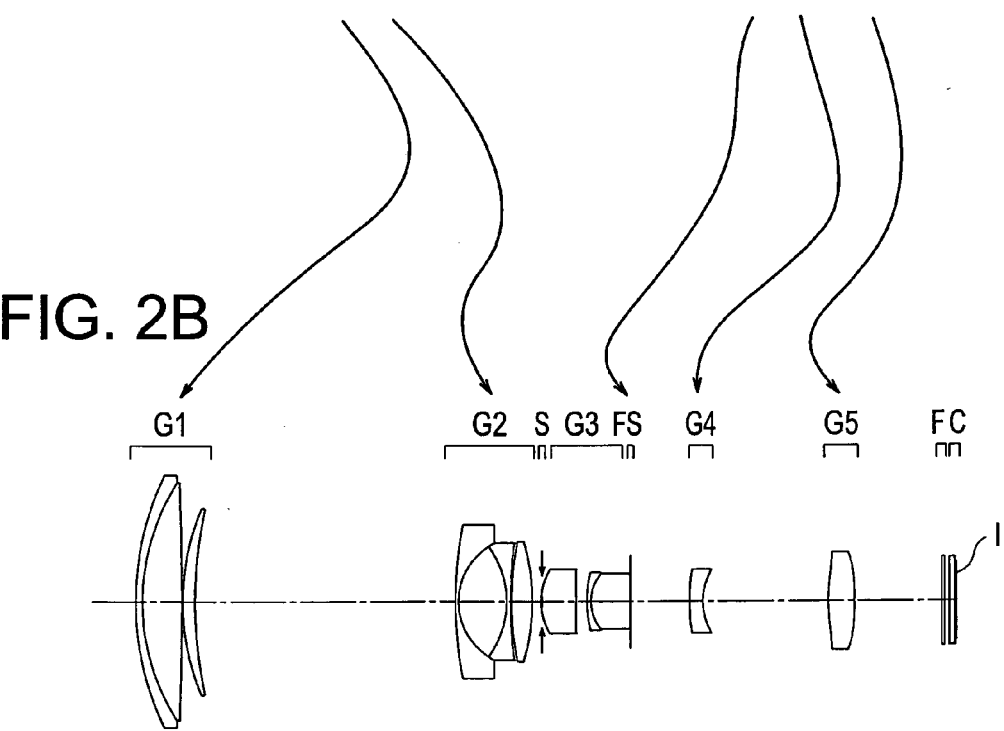

As shown in FIGS. 2A and 2B, the zoom lens according to the second embodiment includes, in order from its object side, a first lens unit G1 having a positive refracting power, a second lens unit G2 having a negative refracting power, an aperture stop S, a third lens unit G3 having a positive refracting power, a flare stop FS, a fourth lens unit G4 having a negative refracting power, and a fifth lens unit having a positive refracting power.

During zooming from the wide angle end to the telephoto end, the first lens unit G1 first moves toward the image side and thereafter reverses its moving direction to move toward the object side, the second lens unit G2 first moves toward the image side, thereafter reverses its moving direction to move toward the object side, and thereafter reverses its moving direction again to move toward the image side, the third lens unit G3 first moves toward the object side and thereafter reverses its moving direction to move toward the image side, the fourth lens unit G4 first moves toward the image side and thereafter reverses its moving direction to move toward the object side, and the fifth lens unit G5 first moves toward the image side, thereafter reverses its moving direction to move toward the object side, and thereafter reverses its moving direction again to move toward the image side.

The first lens unit G1 is composed of a cemented lens made up of a negative meniscus lens having a convex surface directed toward the object side and a biconvex positive lens, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a biconvex positive lens, and a cemented lens made up of a negative meniscus lens having convex surface directed toward the object side and a biconvex positive lens. The fourth lens unit G4 is composed of a negative meniscus lens having a convex surface directed toward the object side. The fifth lens unit G5 is composed of a biconvex positive lens.

There are six aspheric surfaces, which include both surfaces of the biconvex negative lens in the second lens unit G2, both surfaces of the object side biconvex positive lens in the third lens unit G3, and both surfaces of the biconvex positive lens in the fifth lens unit G5.

Figure 3A:
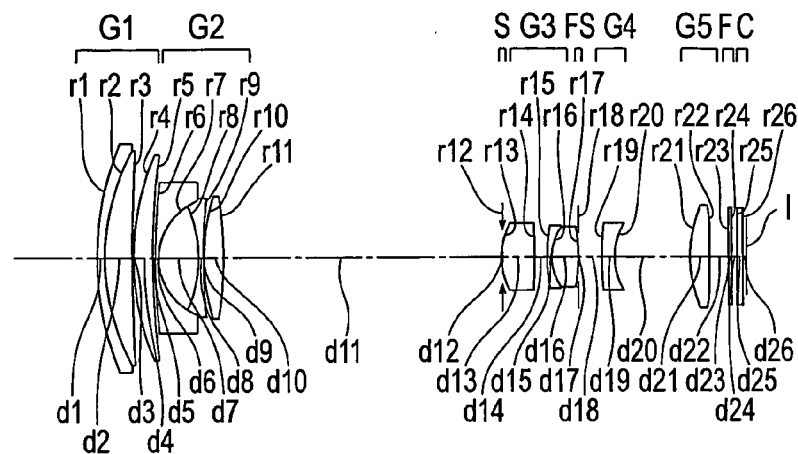
FIGS. 3A and 3B are cross sectional views, similar to FIGS. 1A and 1B, of a zoom lens according to a third embodiment of the present invention.
Figure 3B:
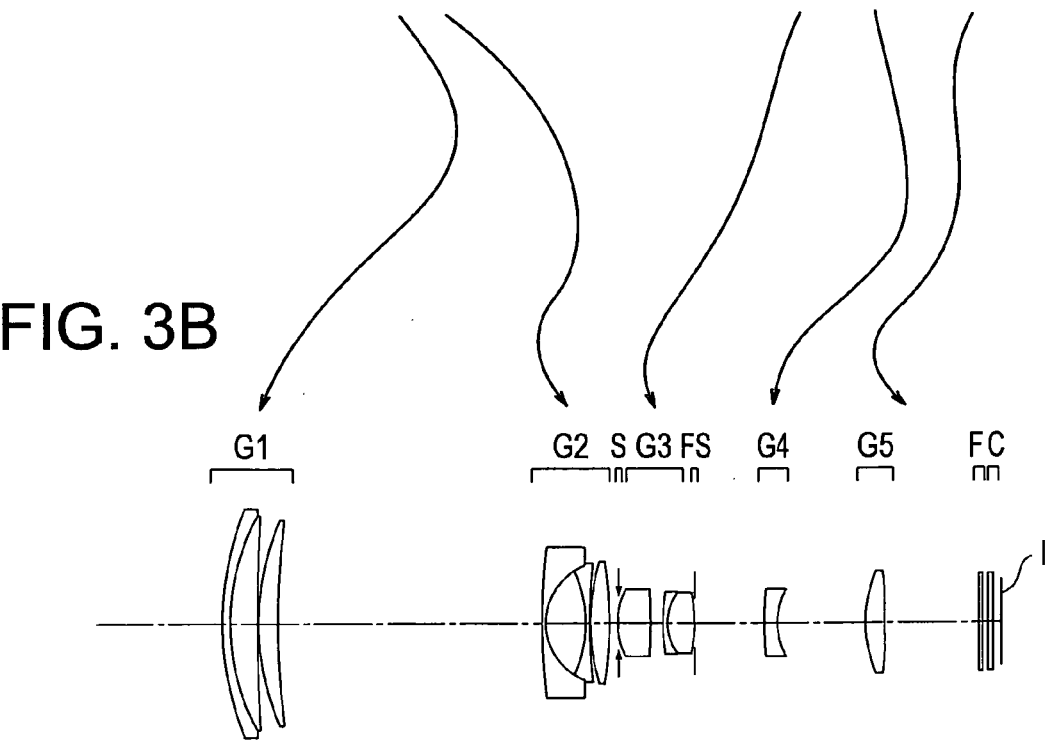

As shown in FIGS. 3A and 3B, the zoom lens according to the third embodiment includes, in order from its object side, a first lens unit G1 having a positive refracting power, a second lens unit G2 having a negative refracting power, an aperture stop S, a third lens unit G3 having a positive refracting power, a flare stop FS, a fourth lens unit G4 having a negative refracting power, and a fifth lens unit G5 having a positive refracting power.

During zooming from the wide angle end to the telephoto end, the first lens unit G1 first moves toward the image side and thereafter reverses its moving direction to move toward the object side, the second lens unit G2 first moves toward the image side, thereafter reverses its moving direction to move toward the object side, and thereafter reverses its moving direction again to move toward the image side, the third lens unit G3 moves toward the object side and thereafter reverses its moving direction to move toward the image side, the fourth lens unit G4 first moves toward the image side and thereafter reverses its moving direction to move toward the object side, and the fifth lens unit G5 first moves toward the object side and thereafter reverses its moving direction three times.

The first lens unit G1 is composed of a cemented lens made up of a negative meniscus lens having a convex surface directed toward the object side and a positive meniscus lens having a convex surface directed toward the object side, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a biconvex positive lens, and a cemented lens made up of a negative meniscus lens having convex surface directed toward the object side and a biconvex positive lens. The fourth lens unit G4 is composed of a negative meniscus lens having a convex surface directed toward the object side. The fifth lens unit G5 is composed of a biconvex positive lens. The lens elements included in each of the lens units are arranged in the mentioned order from the object side.

There are six aspheric surfaces, which include both surfaces of the biconvex negative lens in the second lens unit G2, both surfaces of the object side biconvex positive lens in the third lens unit G3, and both surfaces of biconvex positive lens in the fifth lens unit G5.

Figure 4A:
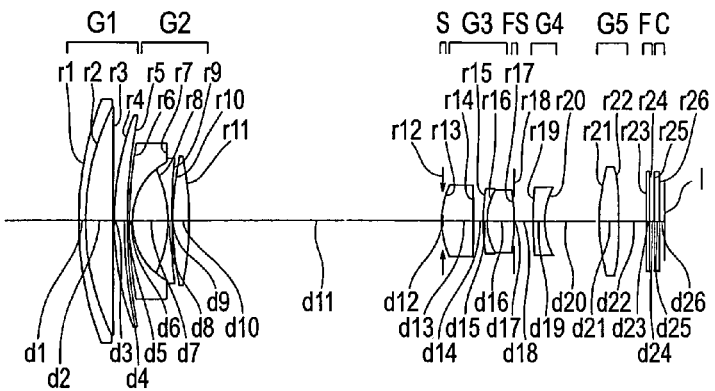
FIGS. 4A and 4B are cross sectional views, similar to FIGS. 1A and 1B, of a zoom lens according to a fourth embodiment of the present invention.
Figure 4B:
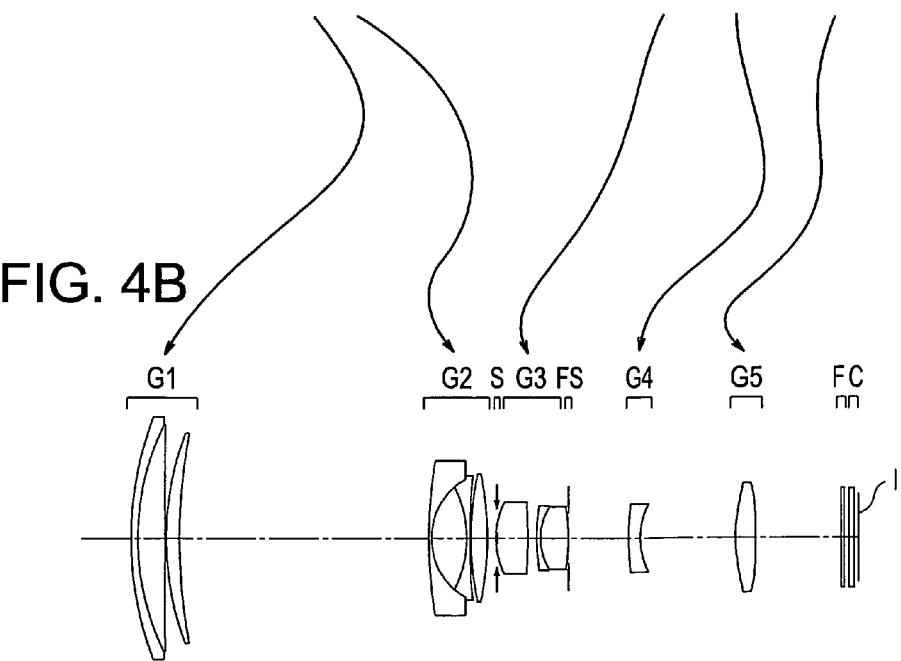
Figure 5A:
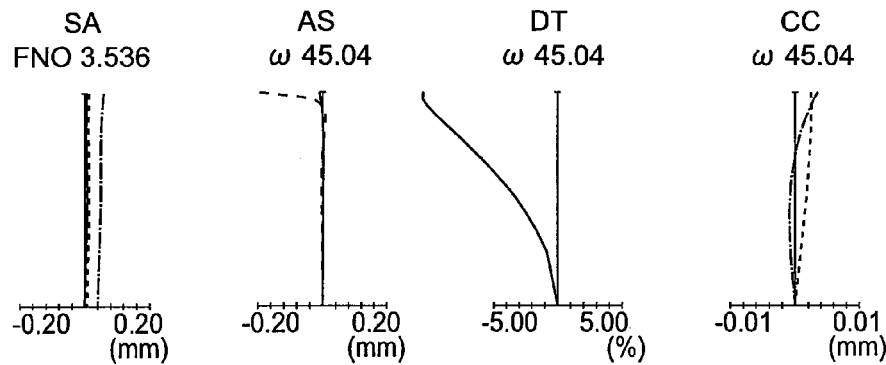
FIGS. 5A, 5B, and 5C show aberrations of the zoom lens according to the first embodiment in the state in which the zoom lens is focused on an object point at infinity.
Figure 5B:
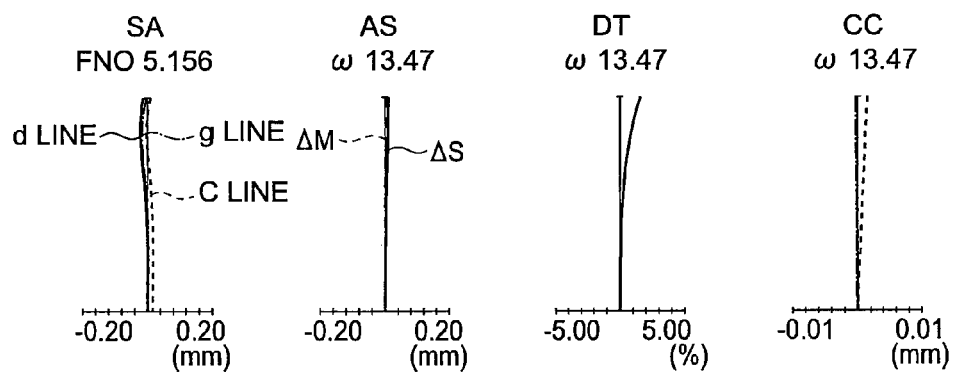
Figure 5C:
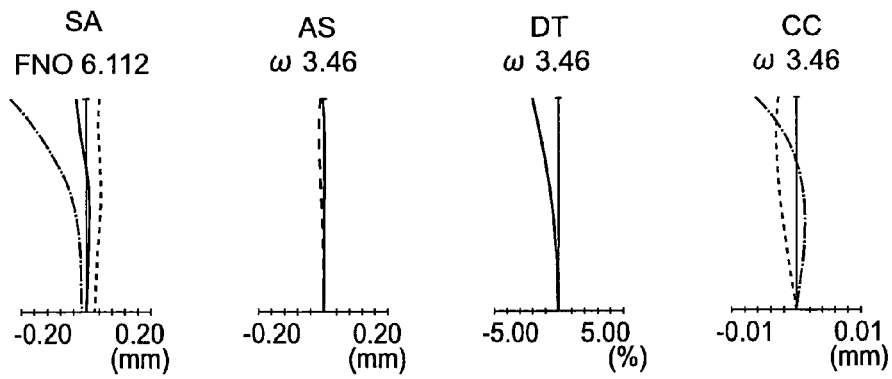
Figure 6A:
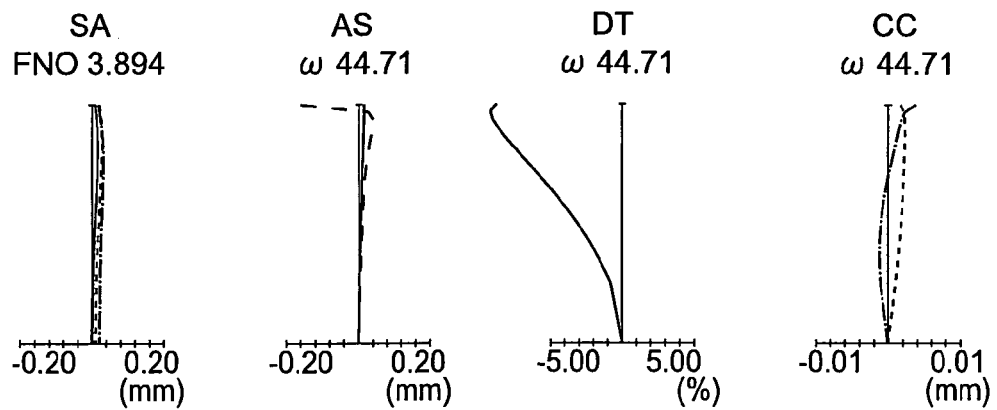
FIGS. 6A, 6B, and 6C show aberrations of the zoom lens according to the second embodiment in the state in which the zoom lens is focused on an object point at infinity.
Figure 6B:
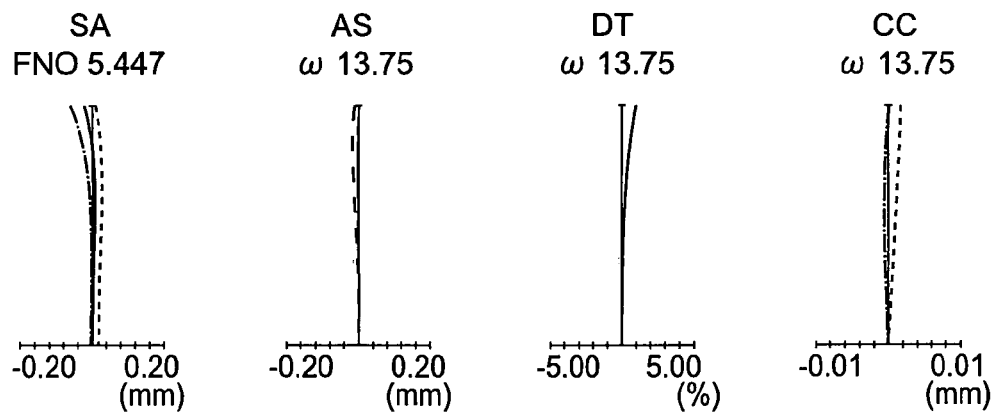
Figure 6C:
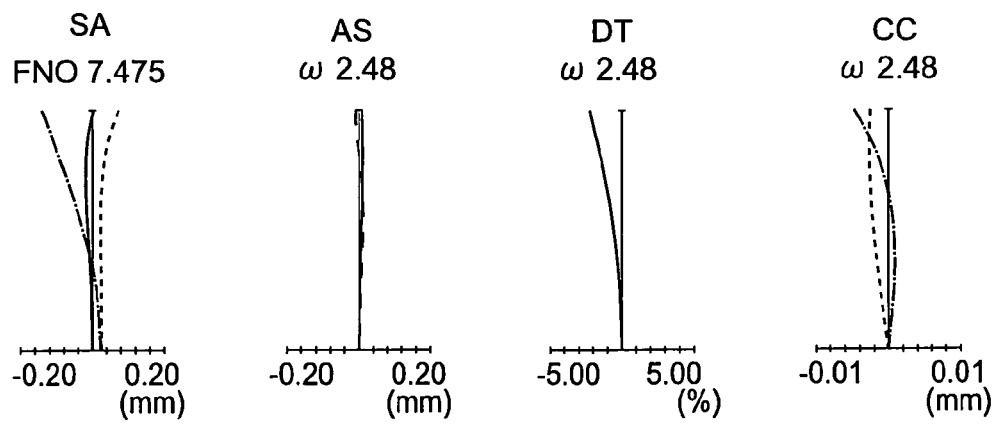
Figure 7A:
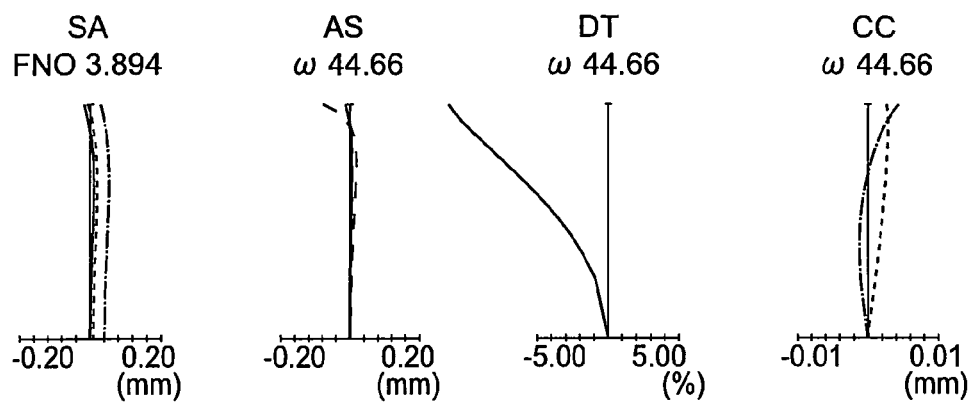
FIGS. 7A, 7B, and 7C show aberrations of the zoom lens according to the third embodiment in the state in which the zoom lens is focused on an object point at infinity.
Figure 7B:
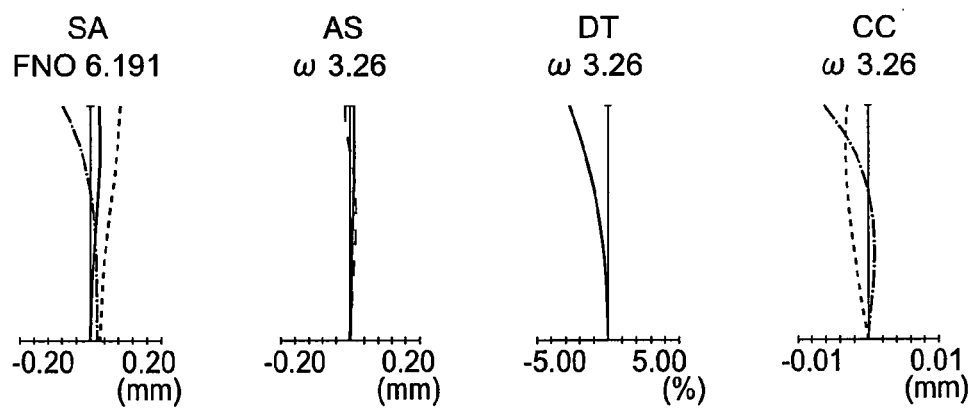
Figure 7C:
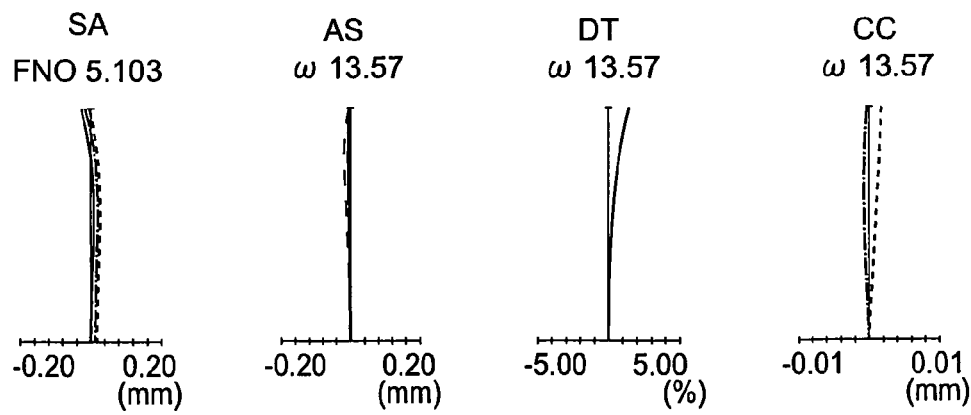
Figure 8A:
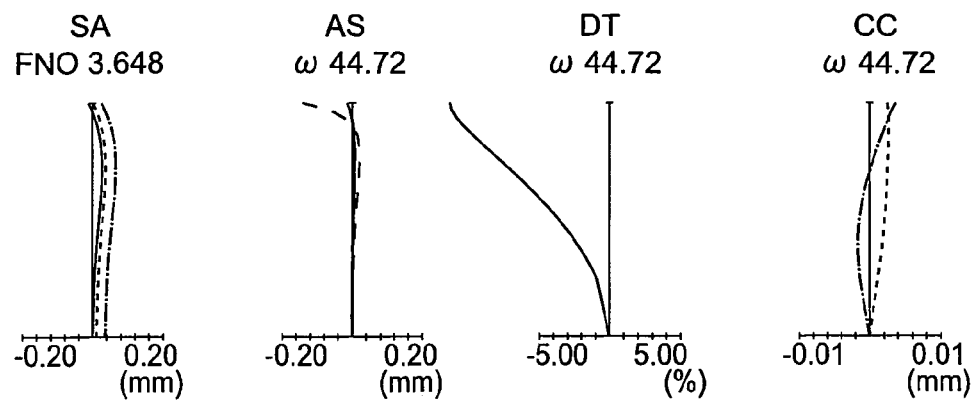
FIGS. 8A, 8B, and 8C show aberrations of the zoom lens according to the fourth embodiment in the state in which the zoom lens is focused on an object point at infinity.
Figure 8B:
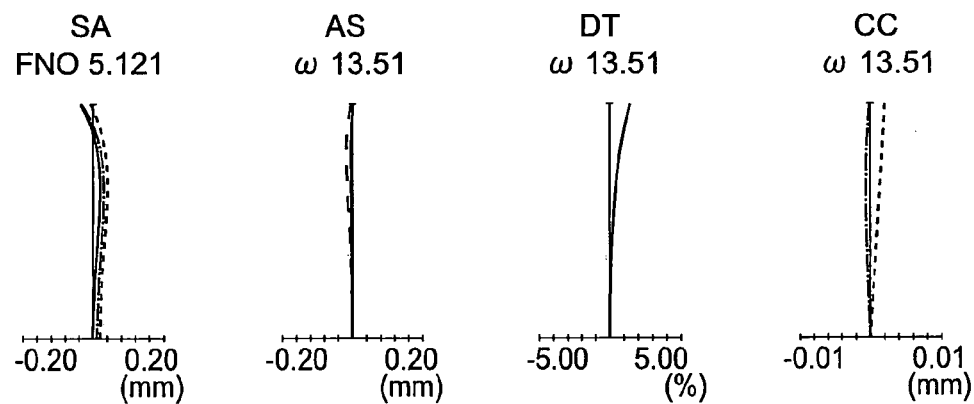
Figure 8C:
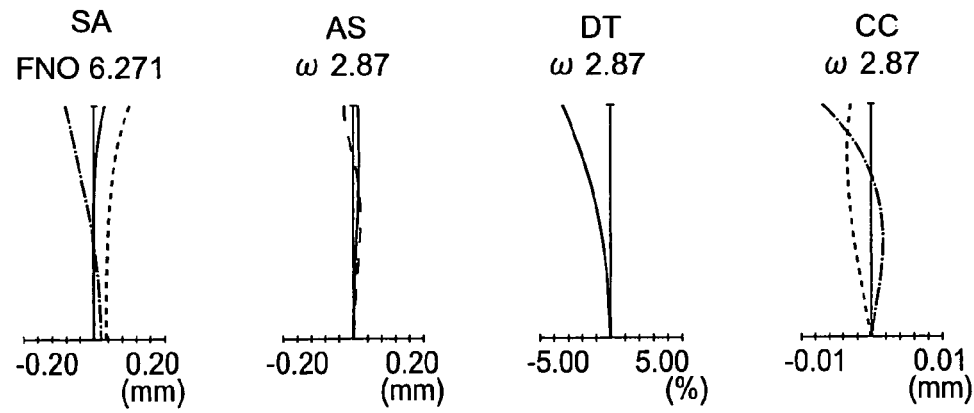

As shown in FIGS. 4A and 4B, the zoom lens according to the fourth embodiment includes, in order from its object side, a first lens unit G1 having a positive refracting power, a second lens unit G2 having a negative refracting power, an aperture stop S, a third lens unit G3 having a positive refracting power, a fourth lens unit G4 having a negative refracting power, and a fifth lens unit G5 having a positive refracting power.

During zooming from the wide angle end to the telephoto end, the first lens unit G1 first moves toward the image side and thereafter reverses its moving direction to move toward the object side, the second lens unit G2 first moves toward the image side, thereafter reverses its moving direction to move toward the object side, and thereafter reverses its moving direction again to move toward the image side, the third lens unit G3 moves toward the object side and thereafter reverses its moving direction to move toward the image side, the fourth lens unit G4 first moves toward the image side and thereafter reverses its moving direction to move toward the object side, and the fifth lens unit G5 first moves toward the object side and thereafter reverses its moving direction three times.

The first lens unit G1 is composed of a cemented lens made up of a negative meniscus lens having a convex surface directed toward the object side and a positive meniscus lens having a convex surface directed toward the object side, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a biconvex positive lens, and a cemented lens made up of a negative meniscus lens having convex surface directed toward the object side and a biconvex positive lens. The fourth lens unit G4 is composed of a negative meniscus lens having a convex surface directed toward the object side. The fifth lens unit G5 is composed of a biconvex positive lens. The lens elements included in each of the lens units are arranged in the mentioned order from the object side.

There are six aspheric surfaces, which include both surfaces of the biconvex negative lens in the second lens unit G2, both surfaces of the object side biconvex positive lens in the third lens unit G3, and both surfaces of the biconvex positive lens in the fifth lens unit G5.

Numerical data of each embodiment described above is shown below. Apart from symbols described above, fb denotes a back focus, each of f1, f2, ... denotes a focal length of each of lens unit, IH denotes an image height, $F_{NO}$ denotes an F number, ω denotes a half angle of field, WE denotes a wide angle end, ST1 denotes a first intermediate state, ST2 denotes a second intermediate state, ST3 denotes a third intermediate state, TE denotes a telephoto end, each of r1, r2, ... denotes radius of curvature of each lens surface, each of d1, d2, ... denotes a distance between two lenses, each of nd1, nd2, ... denotes a refractive index of each lens for a d-line, and each of vd1, vd2, ... denotes an Abbe constant for each lens. Further, * denotes an aspheric data.

The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 42.993 | 0.70 | 1.90200 | 25.10 |
| 2 | 28.165 | 3.27 | 1.49700 | 81.54 |
| 3 | −114.957 | 0.10 | | |
| 4 | 25.265 | 2.35 | 1.62280 | 57.05 |
| 5 | 61.737 | Variable | | |
| 6 | 56.806 | 0.30 | 1.88300 | 40.76 |
| 7 | 5.430 | 3.33 | | |
| 8* | −9.085 | 0.40 | 1.86400 | 40.58 |
| 9* | 18.310 | 0.09 | | |
| 10 | 14.169 | 1.63 | 1.92286 | 18.90 |
| 11 | −28.957 | Variable | | |
| 12(Stop) | ∞ | −0.10 | | |
| 13* | 6.103 | 1.54 | 1.58313 | 59.38 |
| 14* | −22.760 | 1.46 | | |
| 15 | 15.445 | 0.40 | 1.90366 | 31.32 |
| 16 | 4.177 | 2.66 | 1.51633 | 64.14 |
| 17 | −12.335 | 0.00 | | |
| 18 | ∞ | Variable | | |
| 19 | 32.064 | 0.72 | 1.58913 | 61.14 |
| 20 | 6.061 | Variable | | |
| 21* | 8.895 | 1.96 | 1.53110 | 55.91 |
| 22* | 35.215 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.37 | | |
| Image plane(Light receiving surface) | ∞ | | | |

Aspherical surface data

8th surface

K = 0.000
A4 = −1.11646e−04, A6 = 2.03246e−06, A8 = −2.28075e−07

9th surface

K = 0.000
A4 = −1.22065e−04, A6 = 6.76604e−06

13th surface

K = 0.000
A4 = −4.95172e−04, A6 = 1.14330e−05, A8 = −1.35532e−06

14th surface

K = 0.000
A4 = 3.55968e−04, A6 = 1.04503e−05, A8 = −1.23438e−06

21st surface

K = 0.000
A4 = −5.59834e−04, A6 = 5.03108e−06, A8 = −1.02598e−07

22nd surface

K = 0.000
A4 = −1.11595e−03, A6 = 1.10353e−05, A8 = −7.09109e−08

Various data

| | WE | ST2 | TE | ST1 | ST3 |
|---|---|---|---|---|---|
| Focal length | 4.54 | 15.64 | 65.28 | 9.07 | 31.32 |
| Fno. | 3.54 | 5.16 | 6.11 | 4.43 | 5.57 |
| Angle of field 2ω | 86.16 | 25.58 | 7.42 | 49.33 | 14.27 |
| IH | 3.58 | 3.83 | 3.83 | 3.83 | 3.83 |
| d5 | 0.30 | 7.24 | 23.59 | 2.18 | 16.82 |

-continued

| Unit mm | | | | | |
|---|---|---|---|---|---|
| d11 | 16.19 | 4.11 | 0.97 | 7.45 | 2.17 |
| d18 | 1.52 | 8.54 | 7.94 | 4.90 | 11.10 |
| d20 | 7.02 | 5.69 | 8.54 | 6.75 | 4.76 |
| d22 | 1.70 | 2.08 | 2.12 | 1.94 | 2.19 |
| fb(in air) | 2.72 | 3.20 | 5.76 | 2.98 | 3.34 |
| Lens total length(in air) | 48.57 | 49.59 | 67.61 | 45.08 | 59.00 |

| Unit focal length | | | | |
|---|---|---|---|---|
| f1 = 38.95 | f2 = −4.98 | f3 = 8.40 | f4 = −12.82 | f5 = 21.84 |

| Zoom ratio 14.51 |
|---|

| Nd L1 | 1.90200 |
|---|---|
| Nd L2 | 1.49700 |
| νd L1 | 25.10 |
| νd L2 | 81.54 |

Example 2

| Unit mm | | | | |
|---|---|---|---|---|
| Surface data | | | | |
| Surface no. | r | d | nd | νd |
| Object plane | ∞ | ∞ | | |
| 1 | 31.919 | 0.70 | 1.90200 | 25.10 |
| 2 | 24.274 | 4.03 | 1.49700 | 81.54 |
| 3 | −355.229 | 0.10 | | |
| 4 | 27.233 | 1.21 | 1.61272 | 58.72 |
| 5 | 48.486 | Variable | | |
| 6 | 44.211 | 0.30 | 1.88300 | 40.76 |
| 7 | 7.096 | 4.91 | | |
| 8* | −9.234 | 0.40 | 1.86400 | 40.58 |
| 9* | 119.847 | 0.06 | | |
| 10 | 34.317 | 2.09 | 1.92286 | 18.90 |
| 11 | −23.411 | Variable | | |
| 12(Stop) | ∞ | −0.10 | | |
| 13* | 6.777 | 3.61 | 1.58313 | 59.38 |
| 14* | −68.841 | 1.11 | | |
| 15 | 13.794 | 0.40 | 1.90366 | 31.32 |
| 16 | 4.768 | 3.99 | 1.51633 | 64.14 |
| 17 | −63.114 | 0.00 | | |
| 18 | ∞ | Variable | | |
| 19 | 22.698 | 1.35 | 1.58913 | 61.14 |
| 20 | 6.883 | Variable | | |
| 21* | 20.004 | 2.65 | 1.53110 | 55.91 |
| 22* | −52.298 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.37 | | |
| Image plane(Light receiving surface) | ∞ | | | |

| Aspherical surface data |
|---|

8th surface

K = 0.000
A4 = 1.44099e−04, A6 = 2.31468e−06, A8 = −2.20900e−09

9th surface

K = 0.000
A4 = 1.07218e−04, A6 = 9.52700e−07

13th surface

K = 0.000
A4 = −7.80770e−05, A6 = −2.14364e−06, A8 = 5.16311e−07

14th surface

K = 0.000
A4 = 4.98246e−04, A6 = −1.70786e−06, A8 = 1.20207e−06

-continued

| Unit mm |
|---|

21st surface

K = 0.000
A4 = −3.71862e−04, A6 = −1.29050e−06, A8 = −1.99723e−08

22nd surface

K = 0.000
A4 = −6.25E−04

| Various data | | | | | |
|---|---|---|---|---|---|
| | WE | ST2 | TE | ST1 | ST3 |
| Focal length | 4.50 | 15.41 | 91.62 | 11.24 | 38.81 |
| Fno. | 3.89 | 5.45 | 7.47 | 4.94 | 7.71 |
| Angle of field 2ω | 89.42 | 27.49 | 4.96 | 37.81 | 11.60 |
| IH | 3.58 | 3.83 | 3.83 | 3.83 | 3.83 |
| d5 | 0.30 | 5.98 | 26.38 | 3.13 | 16.17 |
| d11 | 29.74 | 7.50 | 1.00 | 10.57 | 4.00 |
| d18 | 0.16 | 9.84 | 5.92 | 6.80 | 7.43 |
| d20 | 5.32 | 2.95 | 12.64 | 3.62 | 7.53 |
| d22 | 3.78 | 2.76 | 8.65 | 2.76 | 12.61 |
| fb (in air) | 5.18 | 4.16 | 10.05 | 4.40 | 14.01 |
| Lens total length(in air) | 67.23 | 57.24 | 82.79 | 55.33 | 75.95 |

| Unit focal length | | | | |
|---|---|---|---|---|
| f1 = 43.76 | f2 = −7.01 | f3 = 11.38 | f4 = −17.31 | f5 = 27.59 |

| Zoom ratio 20.35 |
|---|

| Nd L1 | 1.90200 |
|---|---|
| Nd L2 | 1.49700 |
| νd L1 | 25.10 |
| νd L2 | 81.54 |

Example 3

| Unit mm | | | | |
|---|---|---|---|---|
| Surface data | | | | |
| Surface no. | r | d | nd | νd |
| Object plane | ∞ | ∞ | | |
| 1 | 30.238 | 0.70 | 1.90200 | 25.10 |
| 2 | 22.363 | 2.50 | 1.49700 | 81.54 |
| 3 | 192.012 | 0.10 | | |
| 4 | 26.001 | 1.75 | 1.61272 | 58.72 |
| 5 | 78.421 | Variable | | |
| 6 | 67.426 | 0.30 | 1.88300 | 40.76 |
| 7 | 5.953 | 3.70 | | |
| 8* | −11.983 | 0.40 | 1.86400 | 40.58 |
| 9* | 54.032 | 0.07 | | |
| 10 | 20.608 | 1.79 | 1.92286 | 18.90 |
| 11 | −37.075 | Variable | | |
| 12(Stop) | ∞ | −0.10 | | |
| 13* | 7.044 | 3.03 | 1.58313 | 59.38 |
| 14* | −34.597 | 1.12 | | |
| 15 | 18.735 | 0.40 | 1.90366 | 31.32 |
| 16 | 5.134 | 2.46 | 1.51633 | 64.14 |
| 17 | −15.611 | 0.00 | | |
| 18 | ∞ | Variable | | |
| 19 | 35.820 | 1.14 | 1.58913 | 61.14 |
| 20 | 6.600 | Variable | | |
| 21* | 11.037 | 1.75 | 1.53110 | 55.91 |
| 22* | 99.216 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.37 | | |

-continued

| Unit mm | |
|---|---|
| Image plane(Light receiving surface) | ∞ |

Aspherical surface data

8th surface

K = 0.000
A4 = 1.04975e−04, A6 = −1.18954e−06, A8 = −1.41468e−08

9th surface

K = 0.000
A4 = 4.56315e−05, A6 = −1.82991e−06

13th surface

K = 0.000
A4 = −2.16467e−04, A6 = −1.72551e−06, A8 = 2.97517e−07

14th surface

K = 0.000
A4 = 3.53153e−04, A6 = −3.59428e−06, A8 = 5.96921e−07

21st surface

K = 0.000
A4 = −3.39071e−04, A6 = 1.03358e−06, A8 = −6.59153e−08

22nd surface

K = 0.000
A4 = −5.61E−04

Various data

| | WE | ST2 | TE | ST1 | ST3 |
|---|---|---|---|---|---|
| Focal length | 4.53 | 15.58 | 69.68 | 10.05 | 33.38 |
| Fno. | 3.84 | 5.10 | 6.19 | 4.58 | 6.34 |
| Angle of field 2ω | 89.32 | 27.15 | 6.52 | 42.18 | 13.31 |
| IH | 3.58 | 3.83 | 3.83 | 3.83 | 3.83 |
| d5 | 0.25 | 7.72 | 24.19 | 3.24 | 15.85 |
| d11 | 25.53 | 6.25 | 0.84 | 9.77 | 3.23 |
| d18 | 2.11 | 8.98 | 6.28 | 6.27 | 7.27 |
| d20 | 6.80 | 4.24 | 7.98 | 4.50 | 4.48 |
| d22 | 1.75 | 2.75 | 8.92 | 3.13 | 11.48 |
| fb(in air) | 3.15 | 4.14 | 10.32 | 4.53 | 12.88 |
| Lens total length(in air) | 58.96 | 52.46 | 70.72 | 49.43 | 64.81 |

Unit focal length

| f1 = 40.11 | f2 = −6.50 | f3 = 10.18 | f4 = −13.93 | f5 = 23.22 |
|---|---|---|---|---|

Zoom ratio 15.39

| Nd L1 | 1.90200 |
|---|---|
| Nd L2 | 1.49700 |
| vd L1 | 25.10 |
| vd L2 | 81.54 |

Example 4

Unit mm

Surface data

| Surface no. | r | d | nd | vd |
|---|---|---|---|---|
| Object plane | ∞ | ∞ | | |
| 1 | 28.827 | 0.70 | 1.90200 | 25.10 |
| 2 | 22.066 | 2.84 | 1.49700 | 81.54 |
| 3 | 5089.907 | 0.10 | | |
| 4 | 25.482 | 1.35 | 1.61272 | 58.72 |
| 5 | 47.099 | Variable | | |
| 6 | 38.688 | 0.30 | 1.88300 | 40.76 |
| 7 | 6.063 | 3.66 | | |
| 8* | −9.472 | 0.40 | 1.86400 | 40.58 |
| 9* | 136.239 | 0.04 | | |
| 10 | 25.967 | 1.71 | 1.92286 | 18.90 |
| 11 | −26.577 | Variable | | |
| 12(Stop) | ∞ | −0.10 | | |
| 13* | 7.034 | 3.28 | 1.58313 | 59.38 |
| 14* | −41.725 | 0.97 | | |
| 15 | 18.100 | 0.40 | 1.90366 | 31.32 |
| 16 | 5.240 | 2.83 | 1.51633 | 64.14 |
| 17 | −16.756 | 0.00 | | |
| 18 | ∞ | Variable | | |
| 19 | 32.034 | 1.19 | 1.58913 | 61.14 |
| 20 | 6.403 | Variable | | |
| 21* | 13.133 | 2.01 | 1.53110 | 55.91 |
| 22* | −267.415 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.37 | | |
| Image plane(Light receiving surface) | ∞ | | | |

Aspherical surface data

8th surface

K = 0.000
A4 = 3.22562e−05, A6 = 3.13603e−06, A8 = 4.83133e−08

9th surface

K = 0.000
A4 = −1.27704e−05, A6 = 4.17142e−06

13th surface

K = 0.000
A4 = −1.73454e−04, A6 = −2.76371e−06, A8 = 5.14308e−07

14th surface

K = 0.000
A4 = 4.08367e−04, A6 = −4.92304e−06, A8 = 9.59352e−07

21st surface

K = 0.000
A4 = −3.69277e−04, A6 = 7.94693e−08, A8 = −4.52350e−08

22nd surface

K = 0.000
A4 = −6.35E−04

Various data

| | WE | ST2 | TE | ST1 | ST3 |
|---|---|---|---|---|---|
| Focal length | 4.53 | 15.65 | 79.86 | 10.66 | 35.11 |
| Fno. | 3.65 | 5.12 | 6.27 | 4.46 | 6.49 |
| Angle of field 2ω | 89.43 | 27.02 | 5.74 | 39.63 | 12.78 |
| IH | 3.58 | 3.83 | 3.83 | 3.83 | 3.83 |
| d5 | 0.20 | 6.30 | 25.54 | 4.28 | 15.90 |
| d11 | 26.10 | 6.53 | 1.00 | 10.28 | 3.65 |
| d18 | 1.92 | 9.50 | 6.07 | 6.43 | 7.54 |
| d20 | 5.49 | 4.33 | 9.76 | 4.18 | 5.76 |
| d22 | 3.06 | 2.65 | 8.81 | 3.19 | 11.85 |
| fb (in air) | 4.46 | 4.05 | 10.21 | 4.59 | 13.25 |
| Lens total length(in air) | 59.64 | 52.38 | 74.25 | 51.42 | 67.78 |

Unit focal length

| f1 = 41.55 | f2 = −6.63 | f3 = 10.40 | f4 = −13.82 | f5 = 23.63 |
|---|---|---|---|---|

Zoom ratio 17.64

| Nd L1 | 1.90200 |
|---|---|
| Nd L2 | 1.49700 |
| vd L1 | 25.10 |
| vd L2 | 81.54 |

FIGS. 5A, 5B, and 5C to 8A 8B, and 8C are aberration diagrams of the zoom lenses according to the first to the fourth embodiments respectively in the state in which the zoom lenses are focused on an object point at infinity. These aberration diagrams show spherical aberration (SA), astigmatism (AS), distortion (DT), and chromatic aberration of magnification (CC) at the wide angle end in FIGS. 5A, 6A, 7A, and 8A, in an intermediate focal length state in FIGS. 5B, 6B, 7B, and 8B, and at the telephoto end in FIGS. 5C, 6C, 7C, and 8C. In these diagrams, "ω" represents the half angle of view.

Next, values of conditional expressions (1)-(5) are shown below.

| Conditional expression | Example 1 | Example 2 | Example 3 | Example 4 |
|---|---|---|---|---|
| (1) | 0.60 | 0.48 | 0.58 | 0.52 |
| (2) | −0.08 | −0.08 | −0.09 | −0.08 |
| (3) | 0.405 | 0.405 | 0.405 | 0.405 |
| (4) | −56.44 | −56.44 | −56.44 | −56.44 |
| (5) | 45.04 | 44.71 | 44.66 | 44.72 |
| (6) | 0.96 | 1.11 | 0.98 | 1.07 |
| (7) | 14.51 | 20.35 | 15.39 | 17.64 |

(Correction of Distortion)

Incidentally, when the zoom lens system of the present invention is used, a digital correction of distortion of an image is carried out electrically. A basic concept for the digital correction of the distortion of an image will be described below.

Figure 9:
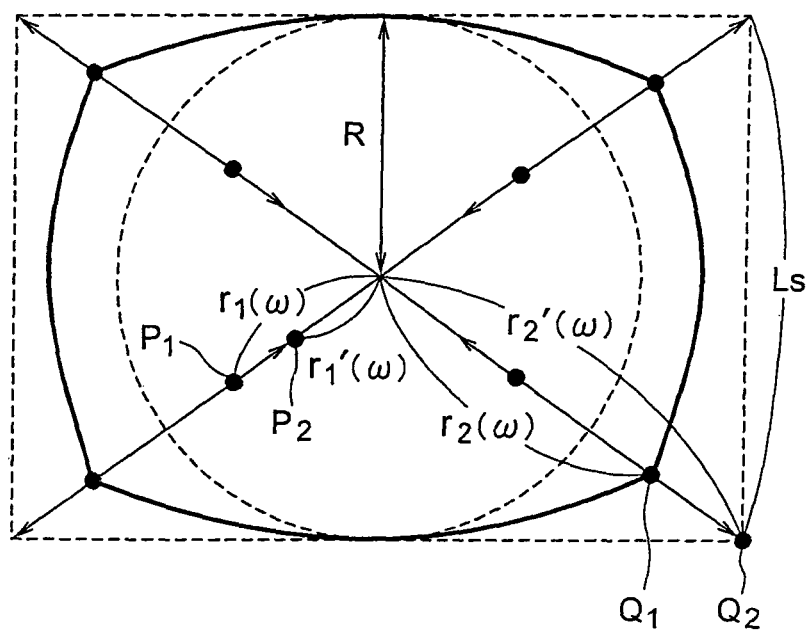
FIG. 9 illustrates correction of distortion.

For example, as shown in FIG. 9, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 9, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega)=\alpha \cdot f \cdot \tan \omega (0 \leq \alpha \leq 1)$$

where, ω is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided maybe calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 10:
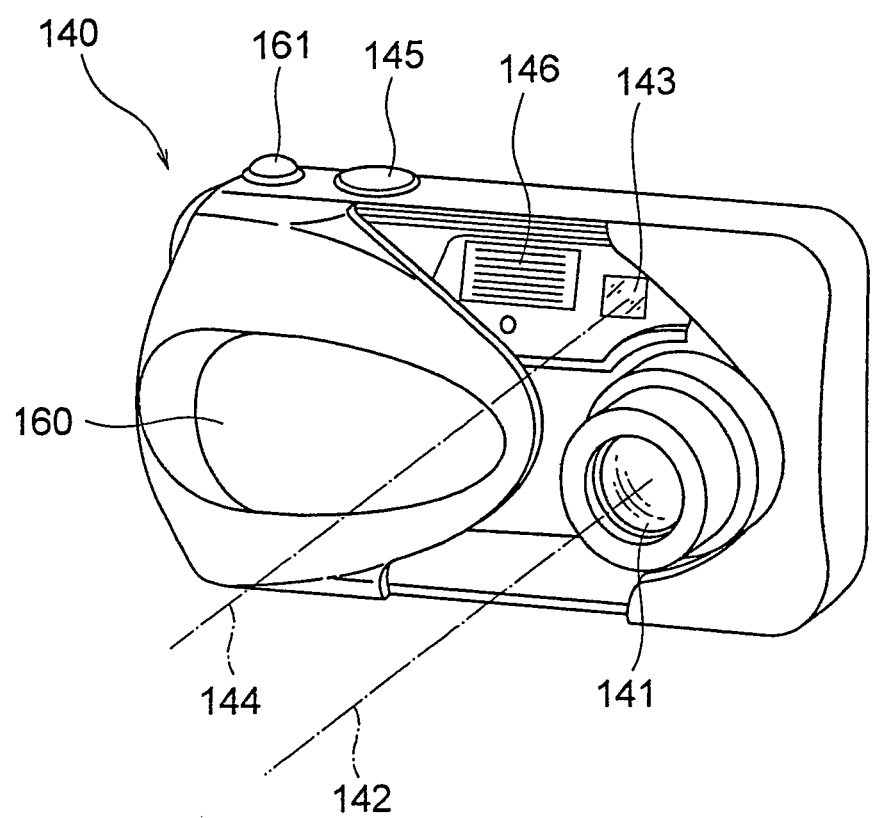
FIG. 10 is a front perspective view showing the outer appearance of a digital camera equipped with a collapsible zoom lens according to the present invention.
Figure 11:
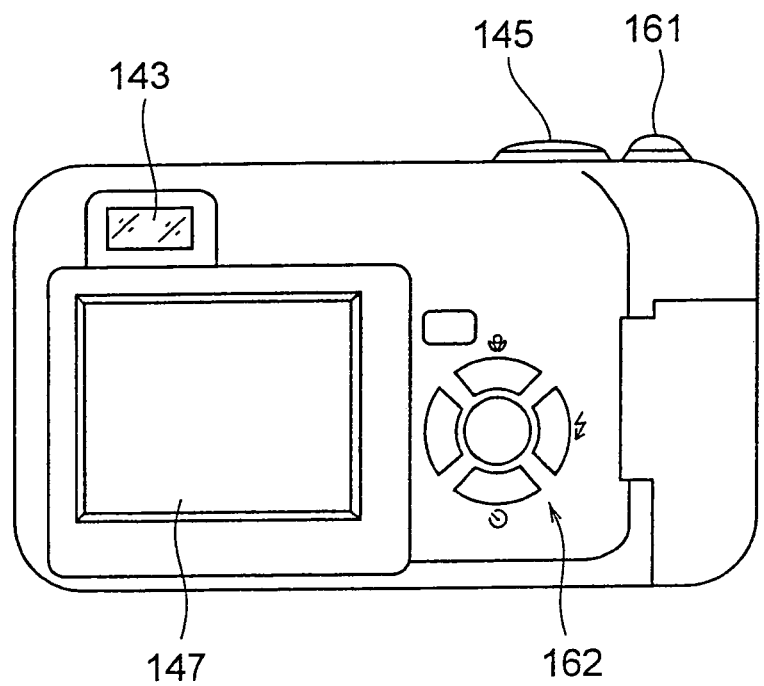
FIG. 11 is a rear perspective view of the digital camera.
Figure 12:
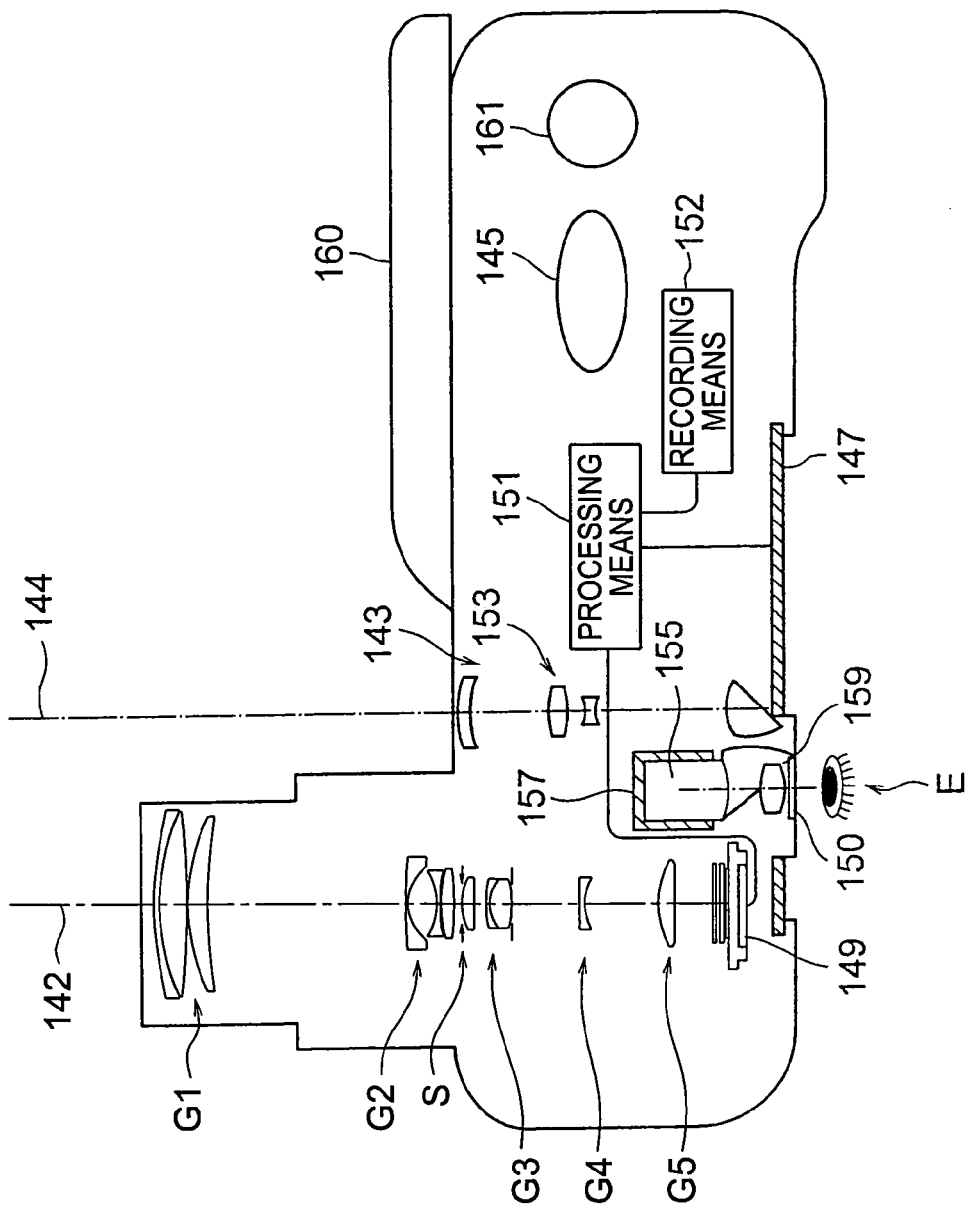
FIG. 12 is a cross sectional view of the digital camera.

FIG. 10 to FIG. 12 are conceptual diagrams of a structure of a digital camera according to the present invention in which a zoom lens system described above is incorporated in a taking optical system 141. FIG. 10 is a front perspective view showing an appearance of a digital camera 140, FIG. 11 is a rear view of the same, and FIG. 12 is a schematic cross-sectional view showing a structure of the digital camera 140. In FIG. 10 and FIG. 12, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 10, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

The zoom lens may be an interchangeable lens that can be detached from the camera body having the image pickup element.

Recently, interchangeable lens cameras not having a quick-return mirror in the camera body have become popular as well as single lens reflex cameras having a quick-return mirror in the camera body. Since the zoom lenses according to the embodiments have an appropriately short back focus, they are preferred for use as interchangeable lenses for such cameras not having a quick return mirror.

(Internal Circuit Structure)

Figure 13:
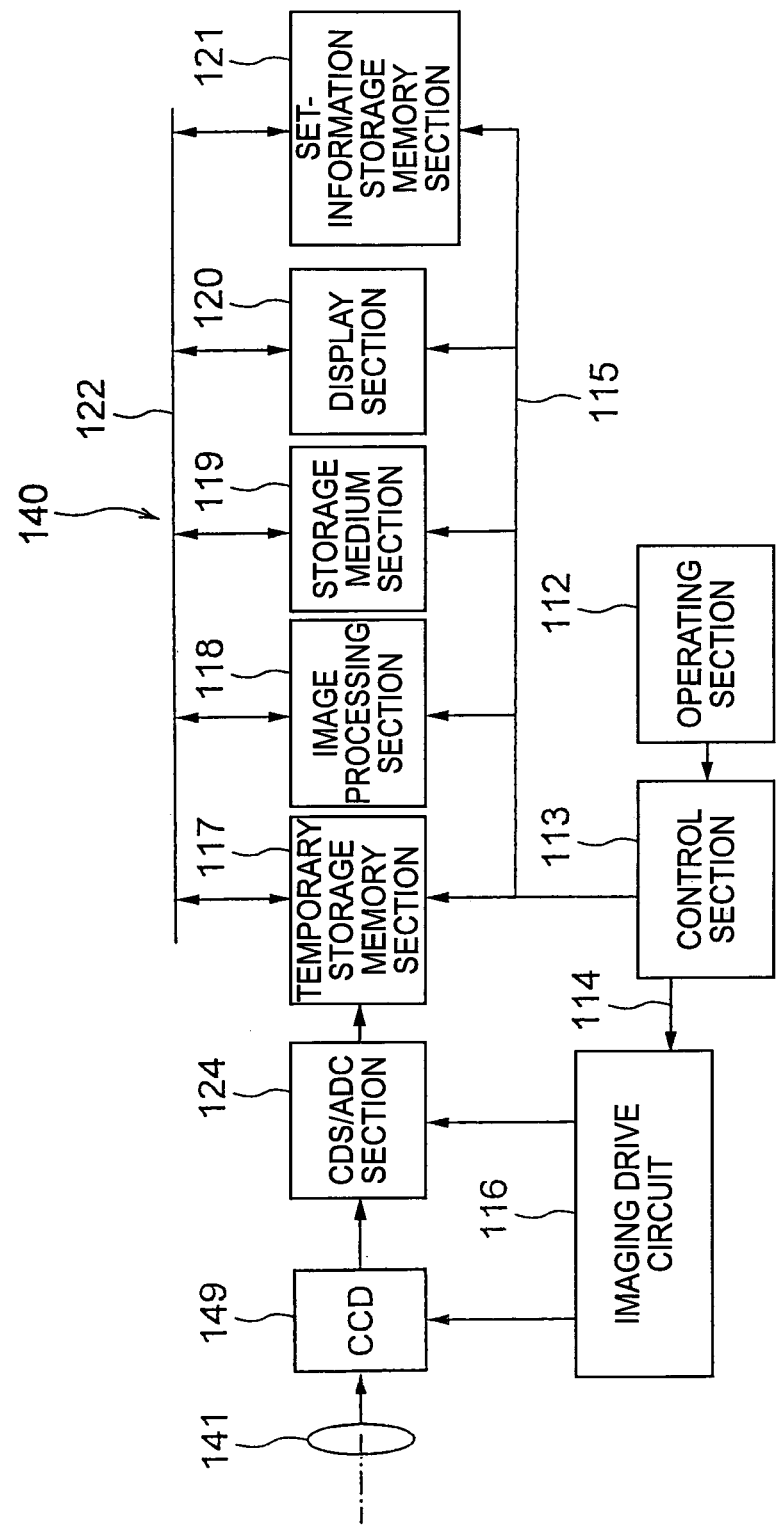
FIG. 13 is a block diagram showing the basic interval circuit configuration of the digital camera.

FIG. 13 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 13, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the image forming optical system according to the present invention is advantageous in achieving an adequately high zoom ratio and a small size.

As will be clearly understood the foregoing description, the present invention can provide an image forming optical system that is advantageous in achieving an adequately high zoom ratio and a small size.

The present invention can further provide an image pickup apparatus equipped with such an image forming optical system.

What is claimed is:

1. An image forming optical system comprising, in order from its object side:
   a first lens unit having a positive refracting power;
   a second lens unit having a negative refracting power;
   a third lens unit having a positive refracting power;
   a fourth lens unit having a negative refracting power; and
   a fifth lens unit having a positive refracting power, wherein
   during zooming from the wide angle end to the telephoto end, the first lens unit, the second lens unit, the third lens unit, the fourth lens unit, and the fifth lens unit move, and the distances between the lens units change,
   the image forming optical system further comprises an aperture stop that moves integrally with the third lens unit during zooming,
   the first lens unit is located closer to the object side at the telephoto end than at the wide angle end,
   the third lens unit is located closer to the object side at the telephoto end than at the wide angle end,
   the first lens unit comprises, in order from the object side, a negative lens, a first positive lens, and a second positive lens,
   the second lens unit comprises a plurality of negative lenses and at least one positive lens,
   the third lens unit comprises a plurality of positive lenses and at least one negative lens,
   the fourth lens unit and the fifth lens unit each comprise two lenses or less,
   the refractive index of the at least one negative lens in the first lens unit for the d-line, the refractive index of the at least one positive lens in the second lens unit for the d-line, the refractive index of the at least one negative lens in the third lens unit for the d-line are not lower than 1.9, and
   the image forming optical system satisfies the following conditional expressions (1) and (2):

$$0.40 < f_1/f_{Tele} < 0.63 \quad (1) \text{ and}$$

$$-0.1 < f_2/f_{Tele} < -0.04 \quad (2),$$

where $f_1$ is the focal length of the first lens unit, $f_2$ is the focal length of the second lens unit, and $f_{Tele}$ is the focal length of the entire image forming optical system at the telephoto end.

2. The image forming optical system according to claim 1, wherein the first lens unit comprises, in order from the object side, a cemented lens made up of the negative lens and the first positive lens, and the second positive lens.

3. The image forming optical system according to claim 1, wherein, the cemented lens in the first lens unit satisfies the following conditional expressions (3) and (4):

$$0.4 < N_1 - N_2 < 2.0 \quad (3), \text{ and}$$

$$v_1 - v_2 < -56.4 \quad (4),$$

where $N_1$ is the refractive index of the negative lens in the first lens unit for the d-line, $N_2$ is the refractive index of the first positive lens in the first lens unit for the d-line, $v_1$ is the Abbe constant of the negative lens in the first lens unit, $v_2$ is the Abbe constant of the first positive lens in the first lens unit.

4. The image forming optical system according to claim 1, wherein the first lens unit includes two lens components, the second lens unit includes two negative lenses and one positive lens, the third lens unit includes two positive lens and one negative lens, the fourth lens unit includes only one negative lens component, and the fifth lens unit includes only one positive lens component, where the term "lens component" is defined to mean a lens member whose surfaces that are in contact with air on the optical axis includes only two surfaces, one being an object side surface and the other being an image side surface.

5. The image forming optical system according to claim 1, wherein a half angle of view at the wide angle end satisfies the following conditional expression (5):

$$44° < \omega_w \quad (5),$$

where $\omega_w$ is the half angle of view of the image forming optical system at the wide angle end.

6. The image forming optical system according to claim 1, wherein the image forming optical system satisfies the following conditional expression (6):

$$93 < f_{Tele}/Z_{Tele} < 1.7 \quad (6),$$

where $f_{Tele}$ is the focal length of the entire image forming optical system at the telephoto end, and $Z_{Tele}$ is the overall length of the image forming optical system from its object side end face to the image plane at the telephoto end.

7. The image forming optical system according to claim 1, wherein only the fifth lens unit moves during focusing.

8. The image forming optical system according to claim 1, wherein the image forming optical system satisfies the following condition:

$$8.5 < f_{Tele}/f_{Wide} \quad (7),$$

where $f_{Wide}$ is the focal length of the entire image forming optical system at the wide angle end.

9. The image forming optical system according to claim 1, wherein the image forming optical system is a five unit zoom lens consisting of five lens units including, in order from the object side, the first lens unit, the second lens unit, the third lens unit, the fourth lens unit, and the fifth lens unit.

10. An image pickup apparatus comprising:
an image forming optical system according to claim 1,
an image pickup element disposed on the image side of the image forming optical system and having an image pickup surface on which an image is formed by the image forming optical system;
an image transforming section that transforms, by image transformation, a signal representing the image picked up by the image pickup element into a signal representing an image that is corrected in terms of distortion; and
a display section that displays the image that is corrected in terms of distortion based on the transformed image signal.

* * * * *